United States Patent [19]

Worth

[11] Patent Number: 4,578,309

[45] Date of Patent: Mar. 25, 1986

[54] LAMINATED MATERIAL

[76] Inventor: Ernest H. Worth, Edwalton Lodge, Edwalton, Nottingham, United Kingdom

[21] Appl. No.: 636,009

[22] Filed: Jul. 30, 1984

[30] Foreign Application Priority Data

Apr. 5, 1984 [GB] United Kingdom ............. 8408756

[51] Int. Cl.⁴ .......................... B32B 3/26; B05D 1/36; C09J 7/02
[52] U.S. Cl. ............................. 428/315.5; 156/219; 156/220; 156/308.4; 427/208.2; 427/261; 427/264; 428/79; 428/347; 428/349; 428/423.1; 428/423.3; 428/913; 428/913.3
[58] Field of Search ................. 428/79, 913, 315.5, 428/346, 349, 347, 423.1, 423.3, 913.3; 156/219, 220, 308.4; 427/261, 264, 208.2

[56] References Cited

U.S. PATENT DOCUMENTS 3,629,035 12/1971 Kuroda .................. 428/79 X
4,042,433 8/1977 Hardy et al. ............. 428/79 X

FOREIGN PATENT DOCUMENTS 1572789 8/1980 United Kingdom ............. 156/220

Primary Examiner—Thomas J. Herbert
Attorney, Agent, or Firm—Bachman & LaPointe

[57] ABSTRACT

A laminated material comprises a layer (2) of a microcellular material capable of changing color upon the application of heat and pressure and having a layer of adhesive (3) bonded thereto. The laminated material can be used in a method of applying a decorative layer or motif (13) to a substrate (11) using a die (5). The die includes shaped projections (10) for heating and compressing the discrete areas of the microcellular material in order to change its color, and includes severing edges (9) for cutting the decorative layer or motif (13) from the laminated material.

14 Claims, 4 Drawing Figures

LAMINATED MATERIAL

This invention relates to a laminated material.

In my U.K. Patent Specification No. 1,572,789 there is described and claimed a method for the application of motifs to textiles. The method comprises assembling a laminate, which has at least one layer of decorative material and a layer of hot melt adhesive adhered thereto, with the textile to which the motif is to be applied. Heat is then applied to the assembly via a die, which is shaped to correspond to the desired motif, whereby the hot melt adhesive is activated in the peripheral regions of the motif in order to adhere the decorative material to the textile substrate in the peripheral regions. The die is then removed and the laminate is stripped from the substrate leaving only the motif defined by the die on the substrate.

According to one aspect of the present invention there is provided a laminated material comprising a layer of a microcellular material capable of changing colour upon the application of heat and pressure, and a layer of an adhesive bonded thereto.

Preferably the microcellular material is a microporous material, more preferably microporous coagulated polyurethane. This can be produced by coagulation from an emulsion in order to form a sheet.

The surface of the microcellular material not bonded to the adhesive is preferably provided with a sueded appearance.

The adhesive is desirably an adhesive having a latent adhesive capacity more preferably a latent cross-linking adhesive capacity. The adhesive is most conveniently of the kind which can be cross-linked by heat and advantageously comprises a urethane material.

Most preferably the adhesive layer is formed from a polyurethane pre-polymer solution which is prepared by mixing polyol and isocyanate components with a solvent.

Advantageously the adhesive is stable at room temperature, and cross-links rapidly and irreversibly at temperatures above about 90° C. It is desirable that substantially no cross-linking of the adhesive occurs at temperatures below about 80° C.

In one embodiment the adhesive is applied to the surface of the microcellular material by spraying. In this embodiment a solution of the adhesive in a solvent may be sprayed onto the surface through an airless dispenser pump and hand spray equipment.

The adhesive may comprise a water based polyurethane such as an aliphatic polyester/urethane block polymer, and in this case an aqueous solvent may be used. Other urethane systems may be used and the solvent may be an organic solvent.

After the solution has been sprayed on the surface, the solvent may be removed, for example by evaporation. If necessary, heat may be applied in order to quicken the evaporation process. This leaves the adhesive uniformly coated on the surface in a dry substantially non-adhesive condition.

In an alternative embodiment a film of adhesive is applied to the surface of the microcellular material. In this embodiment a solution of the adhesive may first be coated on release paper.

The film advantageously possesses characteristics of a hot-melt adhesive at temperatures below the cross-linking temperature, so that it can be adhered to the surface of the microporous material at a temperature below the cross-linking temperature. After the adhesive has been adhered to the surface of the microporous material, the release paper may be stripped from the adhesive.

According to a further aspect of the invention there is provided a method of applying a decorative layer or motif to a substrate, comprising assembling a laminated material as described above with a substrate, applying pressure by means of a heated die to compress discrete areas of the upper surface of the microcellular material, and activating the adhesive in order to effect bonding between the laminated material and the substrate.

Advantageously the adhesive is an adhesive having a latent cross-linking capacity, as described above, and is heated to a temperature above its cross-linking temperature so that it cross-links irreversibly.

Preferably the decorative layer or motif comprises a label, more preferably a label for a garment. The decorative layer or motif may also comprise decorative panelling or eyelets. The substrate is preferably a garment, but may form part of a shoe upper, a belt or a handbag.

The substrate may be a textile material such as natural suede leather, artificial suede leather, canvas, coated or woven fabrics, knitted fabrics, non-woven fabrics, plastics such as polyvinyl chloride or polyurethane, or any other natural or synthetic materials.

Advantageously, the die includes a shaped projection which is adapted to heat and compress the discrete areas of the microcellular material. This causes the discrete areas to take on an apparently different colour.

The shaped projection can be configured to produce a wide variety of different effects upon the surface of the microporous material, such as leather graining, simulated stitching, imitation quilting and logos.

The die may also include a severing edge for cutting the decorative layer or motif from the laminated material. The severing edge may be adapted to act as a heating zone in order to activate the adhesive in the peripheral regions of the decorative layer or motif, thereby bonding the decorative layer or motif to the substrate.

BRIEF DESCRIPTION OF THE DRAWINGS

Reference is now made to the accompanying drawings in which:

In FIG. 1, a laminated material generally designated 1 comprises a layer 2 of a microcellular microporous coagulated polyurethane having a layer 3 of a latent cross-linking adhesive bonded to a lower surface thereof.

The adhesive layer 3 can be formed from a polyurethane pre-polymer solution and has characteristics such that it cross-links rapidly and irreversibly at temperatures above about 90° C. At room temperature the adhesive layer 3 is stable, and substantially no cross-linking occurs at temperatures below about 80° C.

The adhesive layer 3 can be bonded to the microcellular layer at a temperature of about 40° C., at which temperature the adhesive has characteristics of a hot-melt adhesive and is sufficiently "tacky" to create an effective bond between the adhesive layer and the polyurethane layer. Since the temperature at which the polyurethane layer 2 and the adhesive layer 3 are bonded is well below 80° C., substantially no cross-linking of the adhesive occurs.

Alternatively a solution of the adhesive layer in a solvent can be sprayed onto the lower surface of the microcellular layer, and the solvent can be removed by evaporation leaving the adhesive layer 3.

Figure 1:
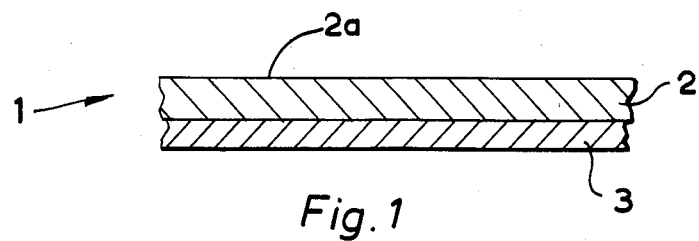
FIG. 1 is a cross-sectional view of a laminated material according to the invention.
Figure 2:
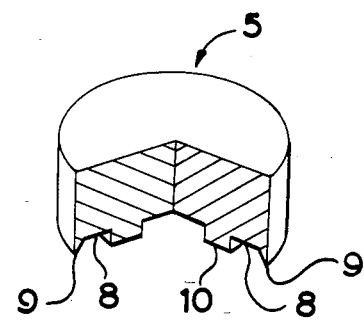
FIG. 2 is a perspective view of a die used in conjunction with the method of the present invention.

In FIG. 2 a die is generally designated 5. A lower surface 8 of the die 5 is provided with a severing edge 9 and with a shaped projection 10 for producing a pattern on an upper surface 2a of the laminated material 1. Both the severing edge 9 and the shaped projection 10 act as heating zones.

Figure 4:
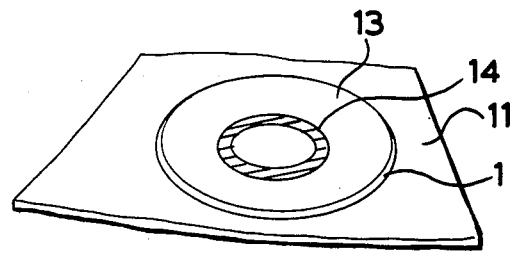
FIG. 4 is a perspective view of the laminated material and the substrate after assembly using the method of the present invention.

The die 5 is shaped to cut a circular motif 13 having an annular pattern thereon from the laminated material 1, as shown in FIG. 4.

Figure 3:
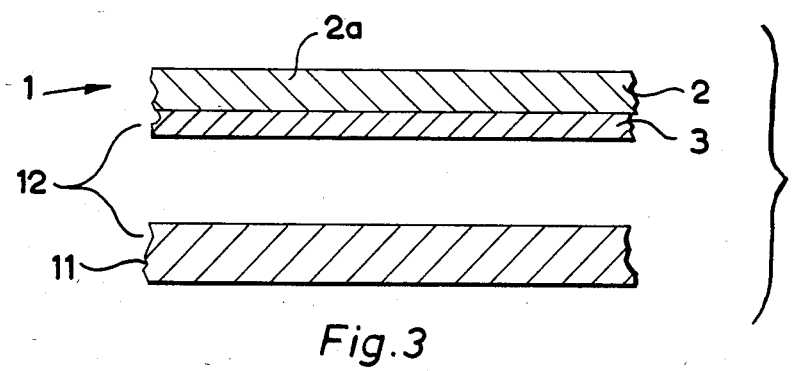
FIG. 3 is a cross-sectional view of a laminated material according to the invention and a substrate, prior to assembly using the method of the present invention.

Referring to FIG. 3 the laminated material 1 is arranged over a substrate 11, so that the adhesive layer 3 faces the substrate.

The laminated material 1 and the substrate 11 in FIG. 3 form an assembly 12 which is subjected to heat and pressure using the die 5.

As the die 5 is pressed into contact with the laminated material 1 the layer of adhesive 3 is activated in the regions which underlie the severing edge 9 and the shaped projection 10 by the heat from the die. The temperature of the heating zones of the die 5 is above 90° C. and causes the activated areas of the adhesive to cross-link irreversibly in order to bond the laminated material 1 to the substrate 11. The severing edge 9 defines the shape of the motif 13 which it is desired to cut from the laminated material 1 and bond to the substrate 11, and it cuts the laminated material 1 at the same time as the adhesive layer 3 is activated.

The shaped projection 10 of the die 5 compresses and heats discrete areas 14 of the upper surface 2a of the laminated material 1 which underlie the shaped projection 10 of the die 5. This causes the microcellular structure to be compacted in this region, and alters the apparent colour of the compressed part of the upper surface 2a of the laminated material 1 in the discrete areas 14. In this way a "two-tone" effect is produced on the upper surface 2a of the laminated material 1.

After bonding has been effected the die 5 is withdrawn and the part of the laminated material 1 not corresponding to the motif 13 can be removed leaving the motif bonded to the substrate 11 as shown in FIG. 4. For convenience, in FIG. 4 layers 2 and 3 of the laminated material 1 have been shown as a single layer.

It will be appreciated that the shape of the severing edge 9 and the projection 10 may be altered in order to change the configuration of the motif 13 or the discrete areas 14.

I claim:

1. A laminated material comprising a layer of a microcellular material capable of changing colour in response to the application of heat and pressure, and a layer of adhesive bonded thereto.

2. A laminated material according to claim 1, in which the microcellular material comprises a microporous coagulated polyurethane.

3. A laminated material according to claim 1, in which the adhesive has a latent adhesive capacity.

4. A laminated material according to claim 3, in which the adhesive has a latent cross-linking adhesive capacity, and can be cross-linked by heat.

5. A laminated material according to claim 4, in which the adhesive is stable at room temperature, and cross-links rapidly and irreversibly at temperatures above about 90° C.

6. A laminated material according to claim 5, in which the adhesive is bonded to the microcellular material by spraying a solution of the adhesive in a solvent onto the surface of the microcellular material, and then evaporating the solvent.

7. A laminated material according to claim 5, in which the adhesive possesses characteristics of a hot-melt adhesive at temperatures below the cross-linking temperature.

8. A laminated material according to claim 7 in which a film of the adhesive is bonded to the microcellular material by heating the film to a temperature below said cross-linking temperature to activate said hot-melt characteristics and applying the film to the surface of the microcellular material.

9. A method of applying a decorative layer or a motif to a substrate, comprising assembling the substrate with a laminated material comprising a layer of microcellular material capable of changing colour in response to the application of heat and pressure, and a layer of adhesive bonded thereto, applying pressure by means of a heated die to compress discrete areas of the upper surface of the microcellular material, and activating the adhesive in order to effect bonding between the laminated material and the substrate.

10. A method according to claim 9, in which the die includes a shaped projection which is adapted to heat and compress the discrete areas of the microcellular material, thereby changing the colour of the microcellular material in said discrete areas.

11. A method according to claim 9, in which the adhesive has a latent cross-linking adhesive capacity, and can be cross-linked by heat.

12. A method according to claim 11, in which the adhesive is heated to a temperature above the temperature at which it cross-links so that it cross-links irreversibly.

13. A method according to claim 9, in which the die includes a severing edge adapted to cut the decorative layer or motif from the laminated material.

14. A method according to claim 13, in which said severing edge is adapted to act as a heating zone in order to activate the adhesive in the peripheral regions of the decorative layer or motif.

* * * * *